United States Patent
Bae et al.

(10) Patent No.: US 10,484,658 B2
(45) Date of Patent: Nov. 19, 2019

(54) APPARATUS AND METHOD FOR GENERATING IMAGE OF ARBITRARY VIEWPOINT USING CAMERA ARRAY AND MULTI-FOCUS IMAGE

(71) Applicant: ELECTRONICS AND TELECOMMUNICATIONS RESEARCH INSTITUTE, Daejeon (KR)

(72) Inventors: Seong Jun Bae, Daejeon (KR); Ho Wook Jang, Daejeon (KR); Wook Ho Son, Daejeon (KR); Jae Woo Kim, Daejeon (KR); Do Hyung Kim, Chungcheongbuk-do (KR); Seong Jin Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 50 days.

(21) Appl. No.: 15/834,237

(22) Filed: Dec. 7, 2017

(65) Prior Publication Data
US 2018/0167599 A1     Jun. 14, 2018

(30) Foreign Application Priority Data
Dec. 8, 2016  (KR) .................. 10-2016-0166776

(51) Int. Cl.
*H04N 13/111* (2018.01)
*G06T 7/73* (2017.01)

(52) U.S. Cl.
CPC ............. *H04N 13/111* (2018.05); *G06T 7/73* (2017.01); *G06T 2207/10012* (2013.01); *G06T 2207/10148* (2013.01)

(58) Field of Classification Search
CPC ......... G06T 19/006; G06T 2207/10012; G06T 2207/10148; G06T 7/73; H04N 13/111;
(Continued)

(56) References Cited

U.S. PATENT DOCUMENTS

| | | | |
|---|---|---|---|
| 9,460,544 B2 | 10/2016 | Johansson et al. | |
| 2001/0043739 A1* | 11/2001 | Oshino | G06K 9/209 382/154 |

(Continued)

FOREIGN PATENT DOCUMENTS

| | | |
|---|---|---|
| KR | 10-2015-0046113 A | 4/2015 |
| KR | 10-2016-0042535 A | 4/2016 |
| WO | 2014/031795 A1 | 2/2014 |

OTHER PUBLICATIONS

Bennett Wilburn et al., "High Performance Imaging Using Large Camera Arrays", the Association for Computing Machinery, Inc., 2005.

*Primary Examiner* — Jingge Wu
(74) *Attorney, Agent, or Firm* — LRK Patent Law Firm (57) ABSTRACT

An arbitrary viewpoint image generation method includes obtaining an original image set photographed by a plurality of cameras included in a camera array at each of at least one focal distance at a same time point; obtaining a multi-focus image set by generating a multi-focus image from the original image set for each of the at least one focal distance; and generating an arbitrary viewpoint image at a position where a viewpoint is to be moved from the multi-focus image set.

18 Claims, 7 Drawing Sheets

(58) Field of Classification Search
CPC ............... H04N 13/243; H04N 13/282; H04N 5/22541; H04N 5/2258; H04N 5/23212
See application file for complete search history.

(56) References Cited

U.S. PATENT DOCUMENTS

| | | | |
|---|---|---|---|
| 2007/0122027 A1* | 5/2007 | Kunita | H04N 13/243 382/154 |
| 2011/0043613 A1* | 2/2011 | Rohaly | G06T 17/00 348/50 |
| 2011/0102596 A1* | 5/2011 | Kotani | G08B 13/19645 348/159 |
| 2012/0229628 A1* | 9/2012 | Ishiyama | H04N 5/23212 348/135 |
| 2013/0162861 A1* | 6/2013 | Yamamoto | H04N 9/045 348/222.1 |
| 2013/0222555 A1* | 8/2013 | Nagasaka | H04N 9/045 348/50 |
| 2013/0223759 A1* | 8/2013 | Nishiyama | G06T 5/50 382/284 |
| 2015/0146029 A1 | 5/2015 | Venkataraman et al. | |
| 2015/0310613 A1* | 10/2015 | Murakami | G02B 21/365 382/128 |
| 2016/0037096 A1* | 2/2016 | Hatakeyama | G06T 5/20 348/241 |
| 2016/0301917 A1* | 10/2016 | Kimura | G06T 5/005 |

* cited by examiner

APPARATUS AND METHOD FOR GENERATING IMAGE OF ARBITRARY VIEWPOINT USING CAMERA ARRAY AND MULTI-FOCUS IMAGE

CROSS-REFERENCE TO RELATED APPLICATION

This application claims priority to Korean Patent Application No. 10-2016-0166776, filed Dec. 8, 2016 in the Korean Intellectual Property Office (KIPO), the entire content of which is hereby incorporated by reference.

BACKGROUND

1. Field of the Invention

The present disclosure relates to a method and an apparatus for generating images of arbitrary viewpoints by using a camera array and a multi-focus image, and more specifically, to a method and an apparatus for generating images of arbitrary viewpoints by using a multi-focus image without using depth information and viewpoint differences.

2. Description of Related Art

As recent image technology develops, three dimensional (3D) image contents are spread, each movie theater displays movie contents in 3D stereoscopic images, 3D TVs are spread in each household, and 3D image contents are actively used. Since the 3D image should provide different images according to viewing directions, it is essential to generate images at an arbitrary or free viewpoint.

Conventionally, a method for generating an arbitrary viewpoint image is to use a viewpoint difference between captured images using two cameras. Such the method uses stereoscopic vision according to the parallax of binocularity. Specifically, two eyes of a person are 65 mm on average apart from each other, so that the images formed on retinas of two eyes may be different even if a same scene is observed. Therefore, it is possible to generate an arbitrary viewpoint image from the viewpoint difference between two images photographed using a parallel camera in which two cameras face the same direction, recognizing a perspective of an object and reflecting such physiological factors. However, this method has a problem that a time required for image generation is very large because a large amount of computation is required to generate the arbitrary viewpoint image.

One of the other methods for generating an arbitrary viewpoint image is to use depth information. This may generate an arbitrary viewpoint image using the given depth information. However, the quality of the arbitrary viewpoint image generated may vary according to the amount and the accuracy of the depth information. Also, there is a problem that the time required for image generation is very long, similarly to the above-described method using the parallel camera. Accordingly, there is a need to shorten the time required for image generation by generating an arbitrary viewpoint image through a method different from the conventional methods, to reduce the amount of data required, and to maintain a consistent quality of an arbitrary viewpoint image.

SUMMARY

Accordingly, embodiments of the present disclosure provide an arbitrary viewpoint image generation method.

Also, embodiments of the present disclosure provide an arbitrary viewpoint image generation apparatus.

In order to achieve the objective of the present disclosure, an arbitrary viewpoint image generation method may comprise obtaining an original image set photographed by a plurality of cameras included in a camera array at each of at least one focal distance at a same time point; obtaining a multi-focus image set by generating a multi-focus image from the original image set for each of the at least one focal distance; and generating an arbitrary viewpoint image at a position where a viewpoint is to be moved from the multi-focus image set.

The method may further comprise, after the obtaining an original image set, performing correction on the original image set by reflecting characteristics of the camera array.

The performing correction may comprise obtaining a characteristic or position of each of the plurality of cameras included in the camera array by using the original image set; and performing correction on each original image included in the original image set by reflecting the obtained characteristic or position.

The obtaining a multi-focus image set may comprise moving each original image included in the original image set in parallel by a positional coordinate of each corresponding camera included in the camera array; and generating the multi-focus image by taking an average for the parallel-moved original images.

The positional coordinate of each corresponding camera may be determined in x pixel coordinate and y pixel coordinate with a reference camera of the camera array as a center.

In the moving each original image, the each original image may be moved by correcting the positional coordinate of each corresponding camera based on a relative distance between a reference focal distance selected from the at least one focal distance and each of the at least one focal distance.

The generating an arbitrary viewpoint image may comprise moving each multi-focus image included in the obtained multi-focus image set in parallel according to a viewpoint movement direction and a viewpoint movement distance; and generating the arbitrary viewpoint image by taking an average for the parallel-moved multi-focus images.

In the moving each multi-focus image, the each multi-focus image may be moved by correcting the viewpoint movement distance based on the relative distance.

The generating an arbitrary viewpoint image may comprise generating the arbitrary viewpoint image by reflecting a variance of pixel values of each of the parallel-moved original images at the at least one focal distance.

The variance may be calculated for each of the at least one focal distance by using a deviation between pixel values of each of the parallel moved original images and pixel values of the generated multi-focus images.

In order to achieve the objective of the present disclosure, an arbitrary viewpoint image generation apparatus may comprise a processor and a memory storing at least one instruction executed by the processor. Also, the at least one instruction may be configured to obtain an original image set photographed by a plurality of cameras included in a camera array at each of at least one focal distance at a same time point; obtain a multi-focus image set by generating a multi-focus image from the original image set for each of the at least one focal distance; and generate an arbitrary viewpoint image at a position where a viewpoint is to be moved from the multi-focus image set.

The at least one instruction may be further configured to perform correction on the original image set by reflecting characteristics of the camera array after the obtaining an original image set.

The at least one instruction may be further configured to obtain a characteristic or position of each of the plurality of cameras included in the camera array by using the original image set; and perform correction on each original image included in the original image set by reflecting the obtained characteristic or position.

The at least one instruction may be further configured to move each original image included in the original image set in parallel by a positional coordinate of each corresponding camera included in the camera array; and generate the multi-focus image by taking an average for the parallel-moved original images.

The positional coordinate of each corresponding camera may be determined in x pixel coordinate and y pixel coordinate with a reference camera of the camera array as a center.

The at least one instruction may be further configured to move the each original image by correcting the positional coordinate of each corresponding camera based on a relative distance between a reference focal distance selected from the at least one focal distance and each of the at least one focal distance.

The at least one instruction may be configured to move each multi-focus image included in the obtained multi-focus image set in parallel according to a viewpoint movement direction and a viewpoint movement distance; and generate the arbitrary viewpoint image by taking an average for the parallel-moved multi-focus images.

The at least one instruction may be further configured to move the each multi-focus image by correcting the viewpoint movement distance based on the relative distance.

The at least one instruction may be further configured to generate the arbitrary viewpoint image by reflecting a variance of pixel values of each of the parallel-moved original images at the at least one focal distance.

The variance may be calculated for each of the at least one focal distance by using a deviation between pixel values of each of the parallel moved original images and pixel values of the generated multi-focus images.

Using the above-described arbitrary viewpoint image generation method and apparatus according to the present disclosure, arbitrary viewpoint images are synthesized without depth information and viewpoint difference information, so that a consistent image quality can be obtained. Further, there is an advantage that the method and apparatus can be used in an application involving generation of an arbitrary viewpoint image when requiring a processing time of 30 frames per second or more because a time taken to generate the arbitrary viewpoint image is short. Also, it is possible to improve the quality of the arbitrary viewpoint image using a variance, and a variance is calculated in units of pixels, which is advantageous in that the calculation amount is small.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings.

Figure 1:
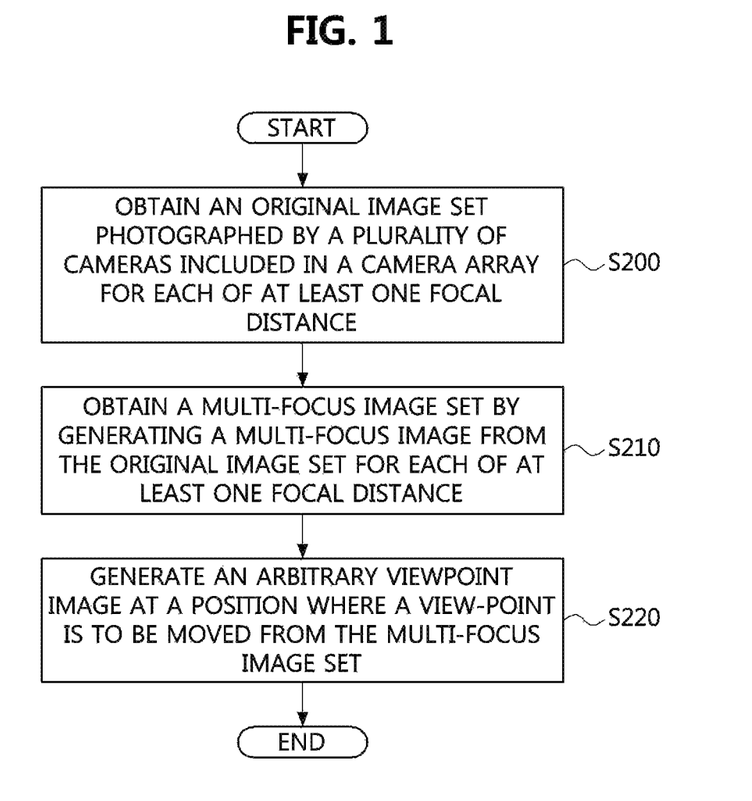
FIG. 1 is a flowchart for explaining an arbitrary viewpoint image generation method according to an embodiment of the present disclosure.
Figure 2:
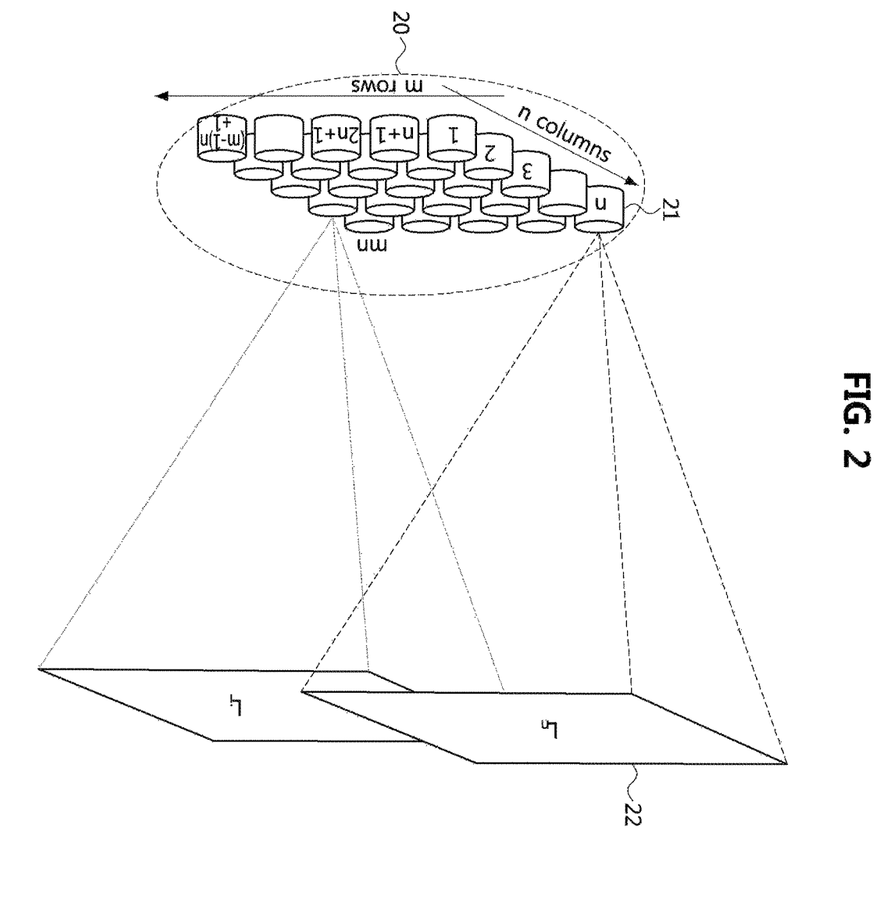
FIG. 2 is a view for explaining an original image set according to a camera array according to an embodiment of the present disclosure.

FIG. 1 is a flowchart for explaining an arbitrary viewpoint image generation method according to an embodiment of the present disclosure, and FIG. 2 is a view for explaining an original image set according to a camera array according to an embodiment of the present disclosure.

Referring to FIG. 1, an arbitrary viewpoint image generation method may comprise a step S200 of obtaining an original image set photographed by a plurality of cameras included in a camera array 20 for each of at least one focal distance, a step S210 of obtaining a multi-focus image set by generating a multi-focus image from the original image set for each of at least one focal distance, and a step S220 of generating an arbitrary viewpoint image at a position where a viewpoint is to be moved from the multi-focus image set.

Herein, the arbitrary viewpoint image generation method may be performed by an arbitrary viewpoint image generation apparatus to be described later, and the arbitrary viewpoint image generation apparatus may be, for example, a desktop computer, a laptop computer, a notebook computer, a smart phone, a tablet PC, a mobile phone, a smart watch, smart glasses, an e-book reader, a portable multimedia player (PMP), a digital camera, a portable game machine, a navigation device, a digital camera, a digital multimedia broadcasting (DMB) player, a digital audio recorder, a digital audio player, a digital video recorder, a digital video player, a personal digital assistant (PDA, or the like.

Referring to FIG. 2, the camera array 20 disclosed in the present disclosure may be a set of cameras, for example, a total of m×n cameras arranged in m rows and n columns. Here, each of the cameras may take a scene having a predetermined resolution, and for example, a scene of a specific resolution taken by an n-th camera (e.g., 21) may be referred to as $L_n$ (e.g. 22), and a scene of a specific resolution taken by an i-th camera may be referred to as $L_i$. As described above, if the camera array 20 is used to for photographing with respect to at least one focal distance, m×n original images may be obtained for each focal distance, and m×n original images photographed at any one focal distance may be referred to as an original image set.

The resolution may be determined differently depending on the type of the cameras, the intention of the photographing, the size of the object to be photographed, and the like, and may be configured as camera-dependent setting or configured for each of the cameras belonging to the camera array 20 by the user.

In the present disclosure, embodiments will be described on the basis of a camera array composed of m×n cameras, and it is preferable that the camera array is composed of an odd number of cameras in each of the horizontal and vertical directions. However, various embodiments of the present disclosure are not limited thereto, and the camera array may be arranged in various shapes and numbers.

Figure 3:
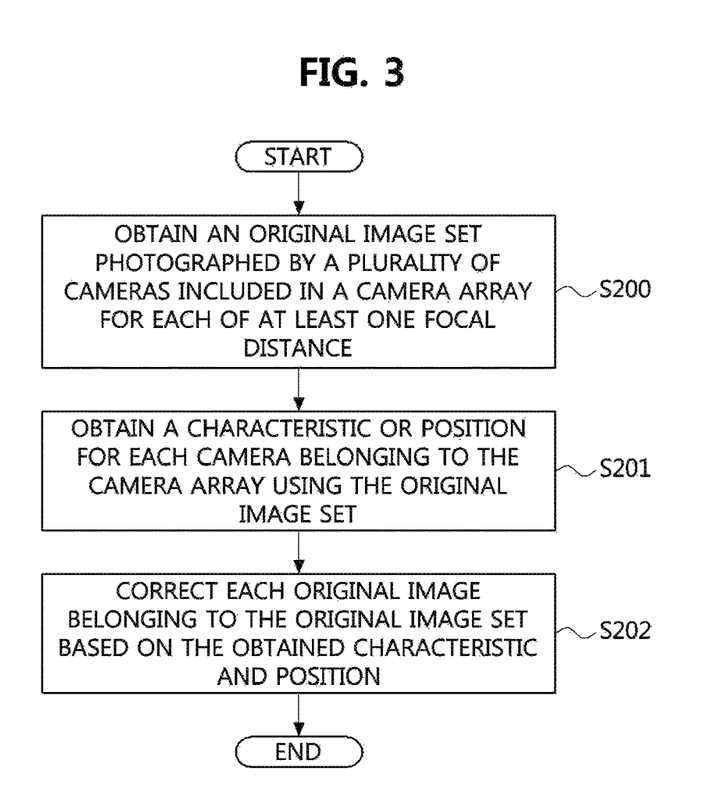
FIG. 3 is a flowchart for explaining an additional step after obtaining an original image set according to an embodiment of the present disclosure.

FIG. 3 is a flowchart for explaining an additional step after obtaining an original image set according to an embodiment of the present disclosure.

Since the original images taken by respective cameras included in the camera array are different from each other in the positions of the cameras included in the camera array and each of the cameras may not all have the same characteristics, it may be necessary to correct these differences. Accordingly, referring to FIG. 3, the arbitrary viewpoint image generation method may further comprise at least one step of performing correction on the original image set by reflecting the characteristics of the camera array after the step S200 in FIG. 1.

Specifically, the step of performing correction on the original image set may comprise a step S201 of obtaining a characteristic or position for each camera belonging to the camera array using the original image set, and a step S202 of correcting each original image belonging to the original image set based on the obtained characteristic and position.

Here, in the step S201, the characteristic or the position may be input by the user or may be obtained by receiving data measured by a separate calibration device or data embedded in the camera array or the camera. Also, the arbitrary viewpoint image generation method may further comprise a step of storing the characteristic or position obtained from the step S201.

Here, a specific method of correcting each original image may vary depending on the obtained characteristic or position, and various methods may be applied according to the ordinary skill in the art to which the present disclosure belongs, and detailed description will be omitted.

Figure 4:
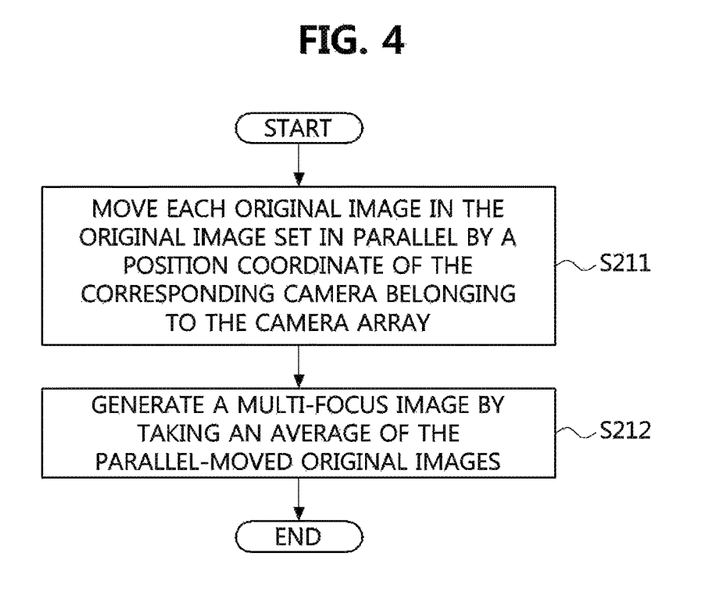
FIG. 4 is a flowchart for explaining a step of obtaining a multi-focus image set according to an embodiment of the present disclosure.
Figure 5:
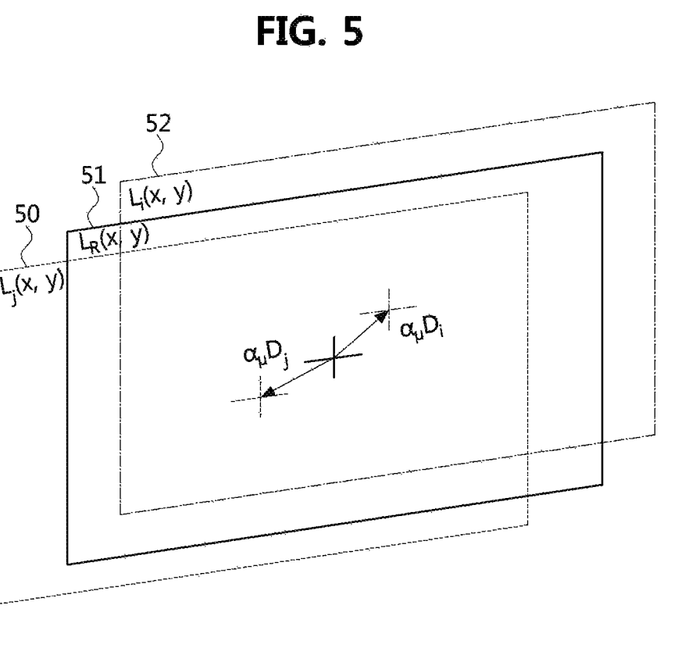
FIG. 5 is a view for explaining a process of re-adjusting original images according to an embodiment of the present disclosure.
Figure 6:
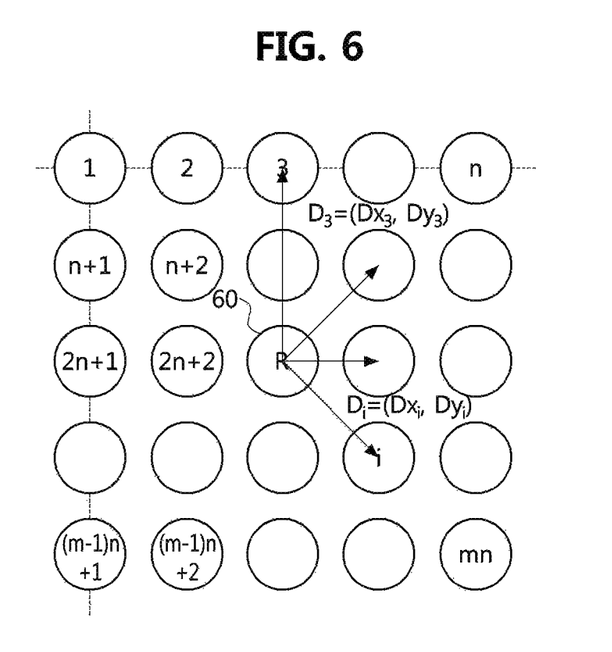
FIG. 6 is a view for explaining coordinates of a camera array according to an embodiment of the present disclosure.
Figure 7:
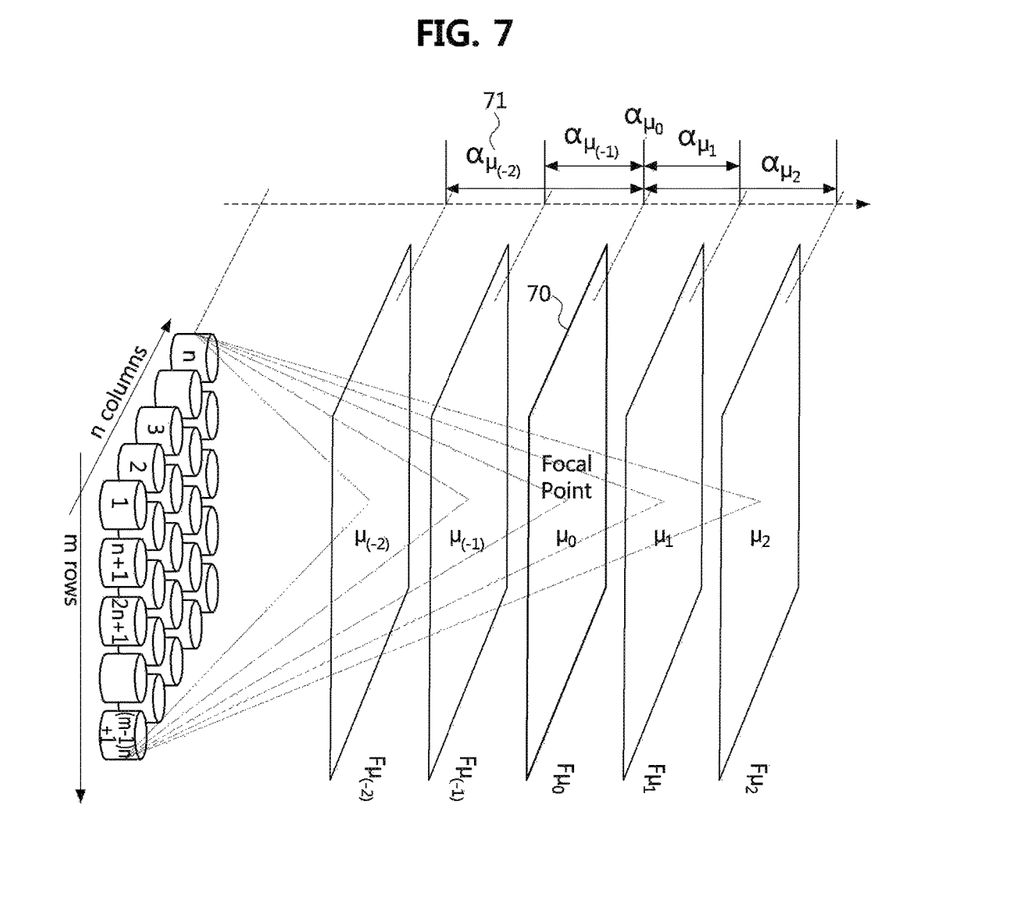
FIG. 7 is a view for explaining a reference focal distance and a multi-focus image according to an embodiment of the present disclosure.

FIG. 4 is a flowchart for explaining a step of obtaining a multi-focus image set according to an embodiment of the present disclosure, FIG. 5 is a view for explaining a process of re-adjusting original images according to an embodiment of the present disclosure, FIG. 6 is a view for explaining coordinates of a camera array according to an embodiment of the present disclosure, and FIG. 7 is a view for explaining a reference focal distance and a multi-focus image according to an embodiment of the present disclosure.

Referring to FIG. 4, the step S210 of obtaining the multi-focus image set in FIG. 1 may include a step S211 of moving each original image in the original image set in parallel by a positional coordinate of the corresponding camera belonging to the camera array, and a step S212 of generating a multi-focus image by taking an average of the parallel-moved original images.

Referring to FIG. 5, original images 50, 51 and 52 at any one of the focal distances may photograph a same view point as difference pixel coordinates because positions of the cameras in the camera array are different from each other. Therefore, it may be necessary to re-adjust the photographed original images. More specifically, the original image 51 ($L_R(x,y)$) photographed by a reference camera, the original image 50 ($L_j(x,y)$) photographed by a first camera, and the original image 52 ($L_i(x,y)$) photographed by a second camera may be re-adjusted in consideration of differences ($D_j$, $D_i$) of their coordinates in the camera array.

Hereinafter, the reference camera and coordinates in the camera array will be described.

Referring to FIG. 6, the reference camera, which is a reference for determining coordinates of cameras included in the camera array, may be set. For example, a camera 60 positioned at the center of the camera array may be set as the reference camera, and the coordinate of the reference camera may be set to (0, 0). Thus, the positional coordinates of the remaining cameras may be determined by pixel coordinates in the x and y directions, with the reference camera of the camera array as the center.

For example, the camera indicated by '3' in FIG. 6 is located two rows apart from the reference camera 60 in the y direction, and may be set to (0, 2) according to the coordinates of the camera array. However, in order to reflect the position difference in the array, it may be preferable to be expressed in pixel units. Therefore, the coordinate (Dx$_3$, Dy$_3$) obtained by multiplying a pixel distance between elements of the camera array to (0, 2) may be the coordinate value of the camera indicated by '3'. As such, the coordinate values in the x and y directions are expressed in pixel units, so that they may be applied as they are when the original image is readjusted.

Referring again to FIG. 5, the original image 50 of the first camera may be moved in parallel by the positional coordinate D$_j$ of the first camera, and the original image 52 of the second camera may be moved in parallel by the positional coordinate D$_t$ of the second camera. Since the pixel coordinate values for a same viewpoint may vary according to the focal distances when moved in parallel, this should be reflected. Therefore, the pixel coordinate values can be corrected based on the relative distances between the focal distances. Hereinafter, the correction will be described.

Referring to FIG. 7, an original image set is photographed with respect to each of at least one different focal distance. Here, a reference focal distance $\alpha_{\mu_0}$ may be selected from among the at least one focal distance, and relative distances of other focal distances $\alpha_{\mu_1}$, $\alpha_{\mu_2}$, $\alpha_{\mu_{-1}}$, and $\alpha_{\mu_{-2}}$ from the reference focal distance may be determined.

For example, if the relative distances $\alpha_{\mu_1}$ and $\alpha_{\mu_2}$ with respect to the reference focal distance are 1 m and 2 m in actual distance, they may be set to 1.0 and 2.0. In this case, the relative distances between the focal distances and the reference focal distance may be set differently to the extent that the actual distance ratio is maintained. More specifically, the relative distances between the focal distances and the reference focal distance may be set in consideration of the actual distance between the focal distances, and may be experimentally determined to be able to derive the pixel values for the same viewpoint as the parallel shift coefficient of each camera coordinate value.

Accordingly, referring again to FIGS. 4 and 5, in the step S211, the positional coordinate of each of the cameras may be corrected based on the reference focal distance selected among the at least one focal distance and the relative distances of the different focal distances. Specifically, the parallel moved original image may be determined by Equation 1 below.

$$L_i(x-\alpha_\mu Dx_i, y-\alpha_\mu Dy_i) \qquad \text{[Equation 1]}$$

Here, $L_i(x, y)$ may be the original image photographed by the i-th camera, and x and y may be pixel coordinates of the original image. Also, Dx$_i$ and Dy$_i$ may respectively mean the x-coordinate and the y-coordinate of the camera position of the i-th camera, and $\alpha_\mu$ may mean the relative distance between the photographed focal distance and the reference focal distance.

That is, the original image $L_i(x, y)$ may be moved in parallel by $\alpha_\mu \cdot Dx_i$ along the x axis and by $\alpha_\mu \cdot Dy_i$ along the y axis.

Then, a multi-focus image $F_\mu(x, y)$ may be generated by taking an average for each pixel value of the parallel moved original images, which may be determined in detail as represented in Equation 2 below.

$$F_\mu(x, y) = \frac{1}{|I|} \sum_{i \in I} L_i(x - \alpha_\mu Dx_i, y - \alpha_\mu Dy_i) \qquad \text{[Equation 2]}$$

Here, i denotes each camera, I denotes a set of cameras included in the camera array, and |I| denotes the number of cameras included in the camera array. Since the multi-focus image is generated for each focal distance, referring again to FIG. 7, respective multi-focus images $F_{\mu_{-2}}$, $F_{\mu_{-1}}$, $F_{\mu_0}$, $F_{\mu_1}$, and $F_{\mu_2}$ may be generated for each focal distance, and each multi-focus image set may be obtained.

Hereinafter, the step S220 in FIG. 1 will be described in detail.

Figure 8:
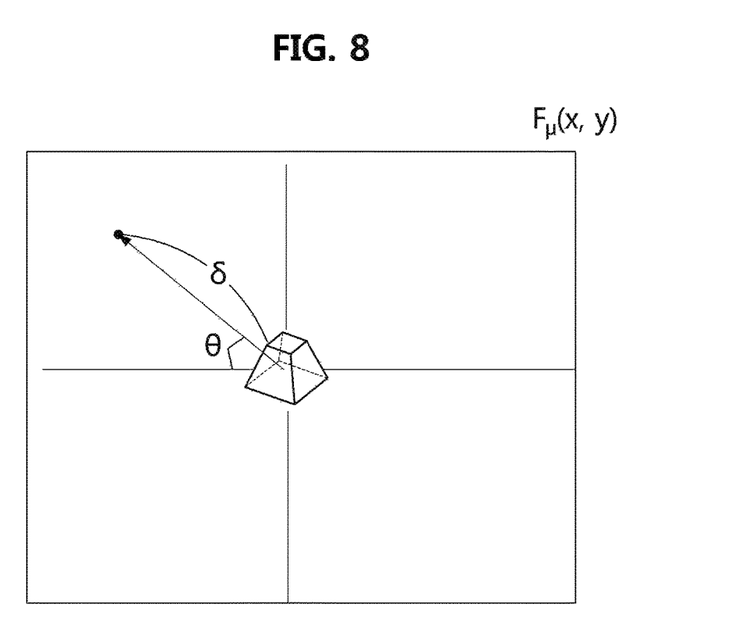
FIG. 8 is an exemplary view for explaining a method of moving a viewpoint in one of the multi-focus images.

FIG. 8 is an exemplary view for explaining a method of moving a viewpoint in one of the multi-focus images.

Referring to FIG. 8, a viewpoint may be moved in a direction indicated by an arrow with respect to a specific object in a multi-focus image, and a direction angle θ and a viewpoint movement distance δ may be determined.

Accordingly, in order to acquire a viewpoint-moved image, a pixel value according to any one viewpoint may be obtained by performing a parallel shift using the direction angle and the viewpoint movement distance with respect to each of the obtained multi-focus images.

Accordingly, the step S220 of generating a viewpoint-moved image in FIG. 1 may comprise a step of concurrently moving each of the plurality of multi-focus images in the obtained multi-focus image set according to the direction angle and movement distance, and a step of generating a viewpoint-moved image by taking an average of the multi-focus images.

Figure 9:
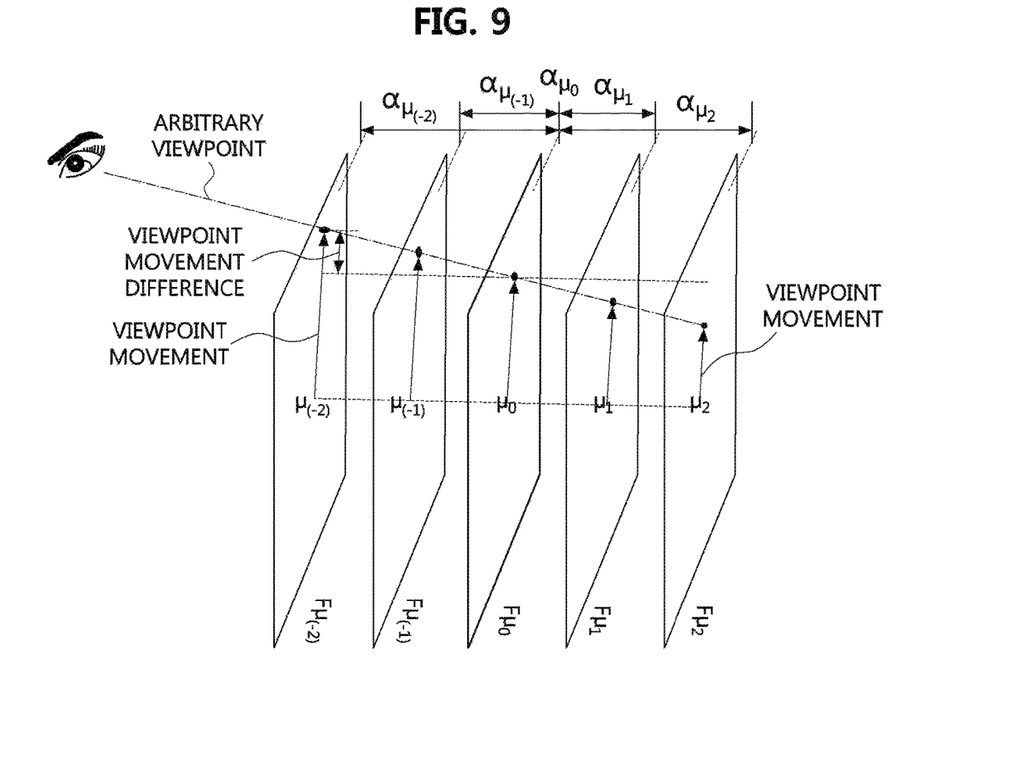
FIG. 9 is an exemplary view for explaining a viewpoint movement difference for each multi-focus image.

FIG. 9 is an exemplary view for explaining a viewpoint movement difference for each multi-focus image.

Referring to FIG. 9, it may be seen that the arbitrary viewpoint moved in parallel by different distances for the multi-focus images obtained at the respective focal distances with the center of the multi-focus images as a reference.

For example, when considering the viewpoint movement distance for the multi-focus image $F_{\mu_0}$ obtained at the reference focal distance and the viewpoint movement distance for the multi-focus image $F_{\mu_{-2}}$ obtained at the different focal distance, there may be a difference in the viewpoint movement distances as illustrated in FIG. 9. Accordingly, since the viewpoint movement distance vary according to the focal distance, it may be preferable to move in parallel by reflecting the focal distance. In summary, the step of moving in parallel according to the direction angle and movement distance of the viewpoint may be performed in parallel by correcting the distance to move the viewpoint on the basis of the relative distance.

Expressing this as a mathematical expression, the multi-focus image may be parallel-moved as shown in Equation 3 below.

$$F_\mu(x+\alpha_\mu \delta \cos \theta, y+\alpha_\mu \delta \sin \theta) \qquad \text{[Equation 3]}$$

Here, θ may be the direction angle at which the viewpoint is moved and δ may be the viewpoint movement distance. Here, the direction angle θ may be in radian units, and δ may be in pixel units. Also, $\alpha_\mu$ may denote the relative distance between a certain focal distance and the reference focal distance.

Also, Equation 3 is a value determined according to the direction angle and the movement distance according to FIG. 8, and the axis that is the reference of the angle may be determined differently, so that the sign of Equation 3 may be changed accordingly. Therefore, Equation 3 derived here may be determined differently according to a reference of the direction angle and of the movement distance. Here, the viewpoint moved image $V_{(\delta,\theta)}(x, y)$ obtained from a set of the parallel-moved multi-focus images may be expressed by Equation 4 below.

$$V_{(\delta,\theta)}(x, y) = \frac{1}{|U|} \sum_{\mu \in U} F_\mu(x + \alpha_\mu \delta \cos\theta, y + \alpha_\mu \delta \sin\theta) \quad \text{[Equation 4]}$$

Here, U may mean at least one focal distance, and |U| may mean the number of focal distances. On the other hand, a multi-focus image may have a well-focused case and a non-well-focused case. Therefore, a multi-focus image in a well-focused case may be reflected more, and a multi-focus image in a non-well-focused case may be reflected less when acquiring the viewpoint-moved image, so that more accurate image can be acquired. It may be determined that the focal point fits better when the variance of pixel values is lower or that the focal point fits worse when the variance of pixel values is higher.

Accordingly, the step S220 of generating the viewpoint-moved image in FIG. 1 may includes a step of generating a viewpoint-moved image by reflecting the variance of the pixel values of each original image moved in parallel at the at least one focal distance.

Here, the variance may be calculated for each of the at least one focal distance using the deviation between the pixel value of each original image that is moved in parallel and the pixel value of the generated multi-focus image. Specifically, the variance $\sigma_\mu(x, y)$ may be expressed by Equation 5 below.

$$\sigma_\mu(x, y) = \sqrt{\frac{1}{|I|} \sum_{i \in I} (F_\mu(x, y) - L_i(x - \alpha_\mu Dx_i, y - \alpha_\mu Dy_i))^2} \quad \text{[Equation 5]}$$

Here, the respective symbols may be the same as those described above. Also, the viewpoint moved image reflecting the variance may be determined as shown in Equation 6 below.

$$\tilde{V}_{(\delta,\theta)}(x, y) = \frac{1}{S(x, y)} \sum_{\mu \in U} \frac{F_\mu(x + \alpha_\mu \delta \cos\theta, y + \alpha_\mu \delta \sin\theta)}{\beta(\sigma_\mu(x, y))^2} \quad \text{[Equation 6]}$$

Here, β may be set differently according to the variance as a proportionality constant, S(x, y) may be determined as $$\sum_{\mu \in U} \frac{1}{\beta(\sigma_\mu(x, y))^2},$$

and other symbols may be the same as those described above.

Figure 10:
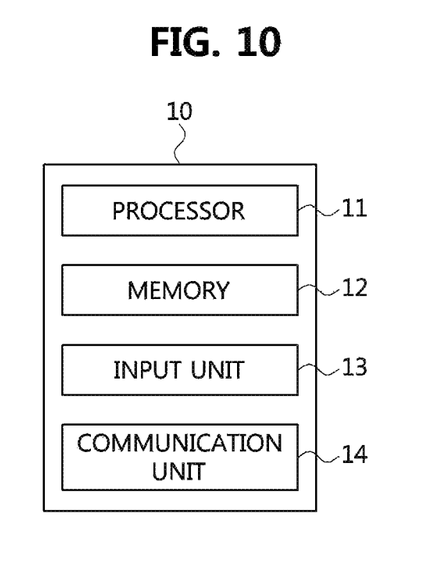
FIG. 10 is a block diagram illustrating an arbitrary viewpoint image generation apparatus according to an embodiment of the present disclosure.

FIG. 10 is a block diagram illustrating an arbitrary viewpoint image generation apparatus according to an embodiment of the present disclosure.

Referring to FIG. 10, an arbitrary viewpoint image generation apparatus 10 according to an embodiment of the present disclosure may comprise a processor 11, and a memory 12 storing at least one instruction executed by the processor 11. Here, the arbitrary viewpoint image generation apparatus 10 may further comprise an input unit 13. The input unit 13 may be a keyboard, a mouse, a touch screen, a memory card reader, or a universal serial bus (USB) interface. The input unit 13 may be used to input an original image set captured by a plurality of cameras included in the camera array.

Here, the arbitrary viewpoint image generation apparatus 10 may further comprise a communication unit 14. The communication unit may be a module capable of communicating with other apparatuses using a wired or wireless network such as a third generation (3G), a long term evolution (LTE), a wireless fidelity (WI-FI), or the like. The apparatus 10 may receive the original image set captured by the camera array through the communication unit 14, or receive data necessary for performing various processes. Also, the data received via the communication unit 14 may be stored in the memory 12.

Here, the processor 11 may obtain an original image set photographed by a plurality of cameras included in the camera array at the same time point for each at least one focal distance, obtain a multi-focus image from the original image set for each at least one focal distance, obtain a multi-focus image set, and generate an arbitrary viewpoint image at a position to which a viewpoint is to be moved from the multi-focus image set.

Here, the processor 11 may perform correction on the original image set by reflecting characteristics of the camera array. Also, the processor 11 may obtain the characteristics or position of each camera belonging to the camera array using the original image set, and correct each original image belonging to the original image set by reflecting the obtained characteristics or position.

Here, the processor 11 may move each original image in the original image set as much as the positional coordinate of each of the cameras belonging to the camera array, and generate a multi-focus image by taking an average for the parallel-moved original images. The positional coordinate of each of the cameras may be determined by the pixel coordinate in the x and y directions with respect to a reference camera of the camera array.

Here, the processor 11 may perform parallel movement by correcting the positional coordinate of each camera based on the predetermined reference focal distance and the relative distance of the different focal distances among the at least one focal distance.

Here, the processor 11 may perform parallel movement of the respective multi-focus images in the acquired multi-focus image set in accordance with the viewpoint movement direction and distance, and take an average for the parallel moved images so as to generate the viewpoint-moved image.

Here, the processor 11 may move the multi-focus image in parallel by correcting the viewpoint movement direction and distance based on a relative distance. The processor 11 may generate a viewpoint moved image (i.e., arbitrary viewpoint image) by reflecting the variance of the pixel values of each original image moved in parallel at the at least one focal distance. Also, the variance may be calculated for each of at least one focal distance using the deviation between the pixel values of the original image and the pixel values of the generated multi-focus image, which are moved in parallel.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An arbitrary viewpoint image generation method comprising:
    obtaining an original image set of a plurality of original images photographed by a plurality of cameras included in a camera array at each of at least one focal distance at a same time point;
    obtaining a multi-focus image set by generating a multi-focus image from the original image set a each of the at least one focal distance; and
    generating an arbitrary viewpoint image at a position where a viewpoint is to be moved from the multi-focus image set,
    wherein the obtaining of the multi-focus image set comprises:
    moving each of the original images in parallel as much as a positional coordinate of each corresponding camera included in the camera array; and
    generating the multi-focus image by taking an average of the parallel-moved original images.

2. The arbitrary viewpoint image generation method according to claim 1, further comprising, after the obtaining of the original image set, performing correction on the original image set by reflecting characteristics of the camera array.

3. The arbitrary viewpoint image generation method according to claim 2, wherein the performing of correction comprises:
    obtaining a characteristic or position of each of the plurality of cameras included in the camera array using the original image set; and
    performing correction on each original image included in the original image set by reflecting the obtained characteristic or position.

4. The arbitrary viewpoint image generation method according to claim 1, wherein the positional coordinate of each corresponding camera is determined in x pixel coordinate and y pixel coordinate with respect to a reference camera of the camera array.

5. The arbitrary viewpoint image generation method according to claim 1, wherein the each original image is moved in parallel by correcting the positional coordinate of each corresponding camera based on a relative distance between a reference focal distance, which is selected from the at least one focal distance, and each of the at least one focal distance.

6. The arbitrary viewpoint image generation method according to claim 5, wherein the generating of the arbitrary viewpoint image comprises:
    moving each multi-focus image included in the obtained multi-focus image set in parallel according to a viewpoint movement direction and a viewpoint movement distance; and
    generating the arbitrary viewpoint image by taking an average of the parallel-moved multi-focus images.

7. The arbitrary viewpoint image generation method according to claim 6, wherein the each multi-focus image is moved in parallel by correcting the viewpoint movement distance based on the relative distance.

8. The arbitrary viewpoint image generation method according to claim 1, wherein the generating of the arbitrary viewpoint image comprises generating the arbitrary viewpoint image by reflecting a variance of pixel values of each of the parallel-moved original images at the at least one focal distance.

9. The arbitrary viewpoint image generation method according to claim 8, wherein the variance is calculated for each of the at least one focal distance by using a deviation between pixel values of each of the parallel-moved original images and pixel values of the generated multi-focus images.

10. An arbitrary viewpoint image generation apparatus comprising a processor and a memory storing at least one instruction executed by the processor, wherein the at least one instruction is configured to:
    obtain an original image set of a plurality of original images photographed by a plurality of cameras included in a camera array at each of at least one focal distance at a same time point;
    obtain a multi-focus image set by generating a multi-focus image from the original image set at each of the at least one focal distance; and
    generate an arbitrary viewpoint image at a position where a viewpoint is to be moved from the multi-focus image set,
    wherein the obtaining of the multi-focus image set comprises:
    moving each of the original images in parallel as much as a positional coordinate of each corresponding camera included in the camera array; and
    generating the multi-focus image by taking an average of the parallel-moved original images.

11. The arbitrary viewpoint image generation apparatus according to claim 10, wherein the at least one instruction is further configured to perform correction on the original image set by reflecting characteristics of the camera array after the obtaining of the original image set.

12. The arbitrary viewpoint image generation apparatus according to claim 11, wherein the at least one instruction is further configured to;
    obtain a characteristic or position of each of the plurality of cameras included in the camera array using the original image set; and perform correction on each original image included in the original image set by reflecting the obtained characteristic or position.

13. The arbitrary viewpoint image generation apparatus according to claim 10, wherein the positional coordinate of each corresponding camera is determined in x pixel coordinate and y pixel coordinate with respect to a reference camera of the camera array.

14. The arbitrary viewpoint image generation apparatus according to claim 10, wherein the at least one instruction is further configured to move the each original image in parallel by correcting the positional coordinate of each corresponding camera based on a relative distance between a reference focal distance, which is selected from the at least one focal distance, and each of the at least one focal distance.

15. The arbitrary viewpoint image generation apparatus according to claim 14, wherein the at least one instruction is configured to:
move each multi-focus image included in the obtained multi-focus image set in parallel according to a viewpoint movement direction and a viewpoint movement distance; and
generate the arbitrary viewpoint image by taking an average for of the parallel-moved multi-focus images.

16. The arbitrary viewpoint image generation apparatus according to claim 15, wherein the at least one instruction is further configured to move the each multi-focus image in parallel by correcting the viewpoint movement distance based on the relative distance.

17. The arbitrary viewpoint image generation apparatus according to claim 10, wherein the at least one instruction is further configured to generate the arbitrary viewpoint image by reflecting a variance of pixel values of each of the parallel-moved original images at the at least one focal distance.

18. The arbitrary viewpoint image generation apparatus according to claim 17, wherein the variance is calculated for each of the at least one focal distance by using a deviation between pixel values of each of the parallel-moved original images and pixel values of the generated multi-focus images.

* * * * *